(12) United States Patent
Steinbach et al.

(10) Patent No.: US 9,626,231 B2
(45) Date of Patent: Apr. 18, 2017

(54) DATABASE DISPATCHER

(71) Applicants: Jochen Steinbach, Bad Schoenborn (DE); Holger Herrmann, Malsch (DE)

(72) Inventors: Jochen Steinbach, Bad Schoenborn (DE); Holger Herrmann, Malsch (DE)

(73) Assignee: SAP SE, Walldorf (DE)

( * ) Notice: Subject to any disclaimer, the term of this patent is extended or adjusted under 35 U.S.C. 154(b) by 618 days.

(21) Appl. No.: 13/893,078

(22) Filed: May 13, 2013

(65) Prior Publication Data

US 2014/0337854 A1    Nov. 13, 2014

(51) Int. Cl.
*G06F 9/46*    (2006.01)
*G06F 9/54*    (2006.01)
*G06Q 10/08*    (2012.01)

(52) U.S. Cl.
CPC .......... *G06F 9/54* (2013.01); *G06Q 10/0875* (2013.01)

(58) Field of Classification Search
None
See application file for complete search history.

(56) References Cited

U.S. PATENT DOCUMENTS

| | | | |
|---|---|---|---|
| 6,496,831 B1 | 12/2002 | Baulier et al. | |
| 7,844,620 B2 | 11/2010 | Barsness et al. | |
| 8,095,512 B2 | 1/2012 | Barsness et al. | |
| 8,315,974 B2 | 11/2012 | Bruening et al. | |
| 8,386,734 B2 | 2/2013 | Chen | |
| 2003/0023773 A1* | 1/2003 | Lee | G06F 9/4426 719/328 |
| 2004/0181510 A1 | 9/2004 | Jardin | |
| 2007/0239790 A1 | 10/2007 | Cattell et al. | |
| 2008/0161940 A1 | 7/2008 | Gerwens et al. | |

(Continued)

FOREIGN PATENT DOCUMENTS

EP    1610243 A1    12/2005
EP    2439656 A1    4/2012

OTHER PUBLICATIONS

HiPERS Batch.Net—A High Performance, Extensible, Reliable and Scalable Batch Framework Using Microsoft.Net Gayatri Lakshmanan Published: Jan. 24, 2012.*

(Continued)

*Primary Examiner* — Emerson Puente
*Assistant Examiner* — Paul Mills
(74) *Attorney, Agent, or Firm* — Schwegman Lundberg & Woessner, P.A.

(57) ABSTRACT

Example methods and systems are directed to dispatching database tasks. An application may access data associated with a task. The data may indicate features (e.g., processing functionality) that will be used to complete the task. The application may determine whether all such features are implemented in the database layer. The application may dispatch the task to the database layer if all features are implemented therein. The application may perform the task in the application layer if one or more of the features are not available in the database layer. In some example embodiments, the task involves materials requirements planning. Such a task may include determining, for a given bill of materials ("BOM"), the quantity of materials available on-hand, the quantity available from suppliers, the transport or delivery time for the various quantities, and other data regarding the BOM.

18 Claims, 8 Drawing Sheets

(56) References Cited

U.S. PATENT DOCUMENTS

2009/0265710 A1* 10/2009 Shen et al. .................... 718/101
2012/0197868 A1    8/2012 Fauser et al.
2012/0324447 A1   12/2012 Huetter et al.

OTHER PUBLICATIONS

A Web Services Façade for an Open Source ERP System Karl Kurbel, Denny Schreber, Brandon Ulrich Published: 2006.*
Encyclopedia of Database Systems Ling Liu and M. Tamer Ozsu "Stored Procedure" definition, p. 2831 Published: 2009.*
Leveraging SOA in Banking Systems' Integration Alaa M. Riad, Ahmed E. Hassan, Qusay F. Hassan Published: 2008.*
Using flows in information integration F. Leymann and D. Roller Published: 2002.*
Hashizume, Yasuhiko, et al., "Ultra-high-speed In-memory Data Management Software for High-speed Response and High Throughput", FUJITSU Sci. Tech. J., vol. 47, No. 3, (Jul. 2011), 316-324.

* cited by examiner

DATABASE DISPATCHER

BACKGROUND

Many applications make use of a database to store data used by the application. Such applications can be visualized as having an application layer on top of a database layer, in which the application layer provides the functionality of the application and the database layer persists the application data.

Some databases include stored procedure functionality, which allows both the retrieval and processing of data to be performed in the database. An application programmer determines whether a particular function should be performed in the application layer or in the database layer. Stored procedures often provide enhanced performance over similar application layer functionality, but can be more difficult to develop, test, and deploy.

BRIEF DESCRIPTION OF THE DRAWINGS

Some embodiments are illustrated by way of example and not limitation in the figures of the accompanying drawings.

DETAILED DESCRIPTION

Example methods and systems are directed to dispatching tasks to a database. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some example embodiments, an application accesses data associated with a task. The data may indicate features that will be used to complete the task. The application may determine whether all such features are implemented in the database layer. In some example embodiments, the application dispatches the task to the database layer if all features are implemented therein. In some example embodiments, the application performs the task in the application layer if one or more of the features are not available in the database layer.

In some example embodiments, the task involves materials requirements planning. Such a task may include determining, for a given bill of materials ("BOM"), the quantity of materials available on-hand, the quantity available from suppliers, the transport or delivery time for the various quantities, and other data regarding the BOM. Additionally, some materials may themselves have component materials. For example, a company may manufacture computers from component parts. In this case, the company may have a number of completed computers on hand, as well as a number of each component part on hand. The company may also have information regarding the ability of its suppliers to provide the component parts. In some example embodiments, the task involves determining, for a given plant or set of plants, information regarding some or all products that are produced at those plants. Each of those products may have an associated BOM.

Figure 1:
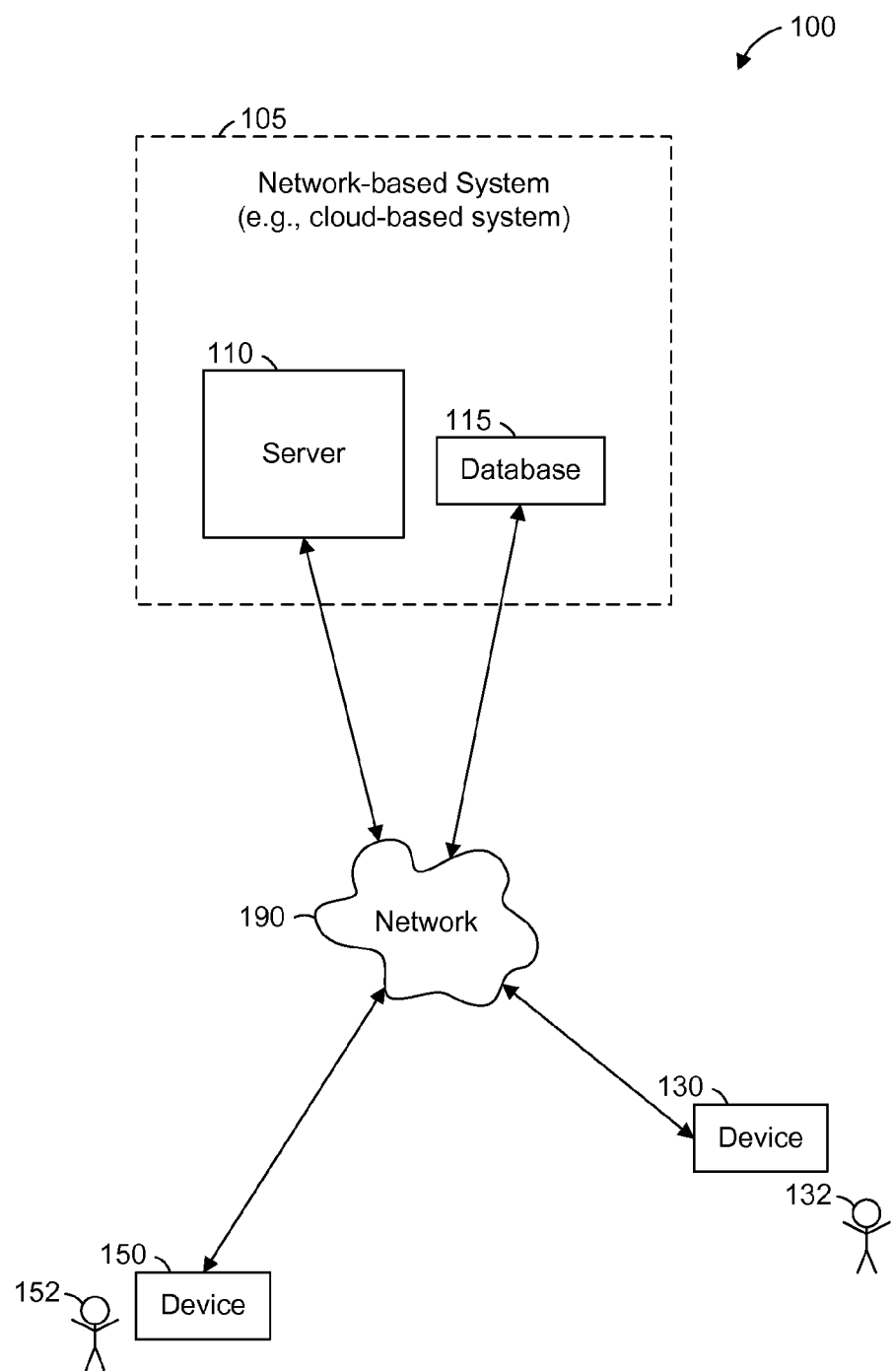
FIG. 1 is a network diagram illustrating a network environment suitable for dispatching database tasks, according to some example embodiments.

FIG. 1 is a network diagram illustrating a network environment 100 suitable for dispatching database tasks, according to some example embodiments. The network environment 100 includes a server machine 110, a database 115, and devices 130 and 150, all communicatively coupled to each other via a network 190. The server machine 110 and the database 115 may collectively comprise a cloud-based system 105 capable of responding to client requests from devices 130 and 150. The server machine 110 may host an application capable of dispatching tasks to the database 115. The server machine 110 and the devices 130 and 150 may each be implemented in a computer system, in whole or in part, as described below with respect to FIG. 8.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. The database may be an in-memory database. The in-memory database may be capable of much higher performance than a disk-based database. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
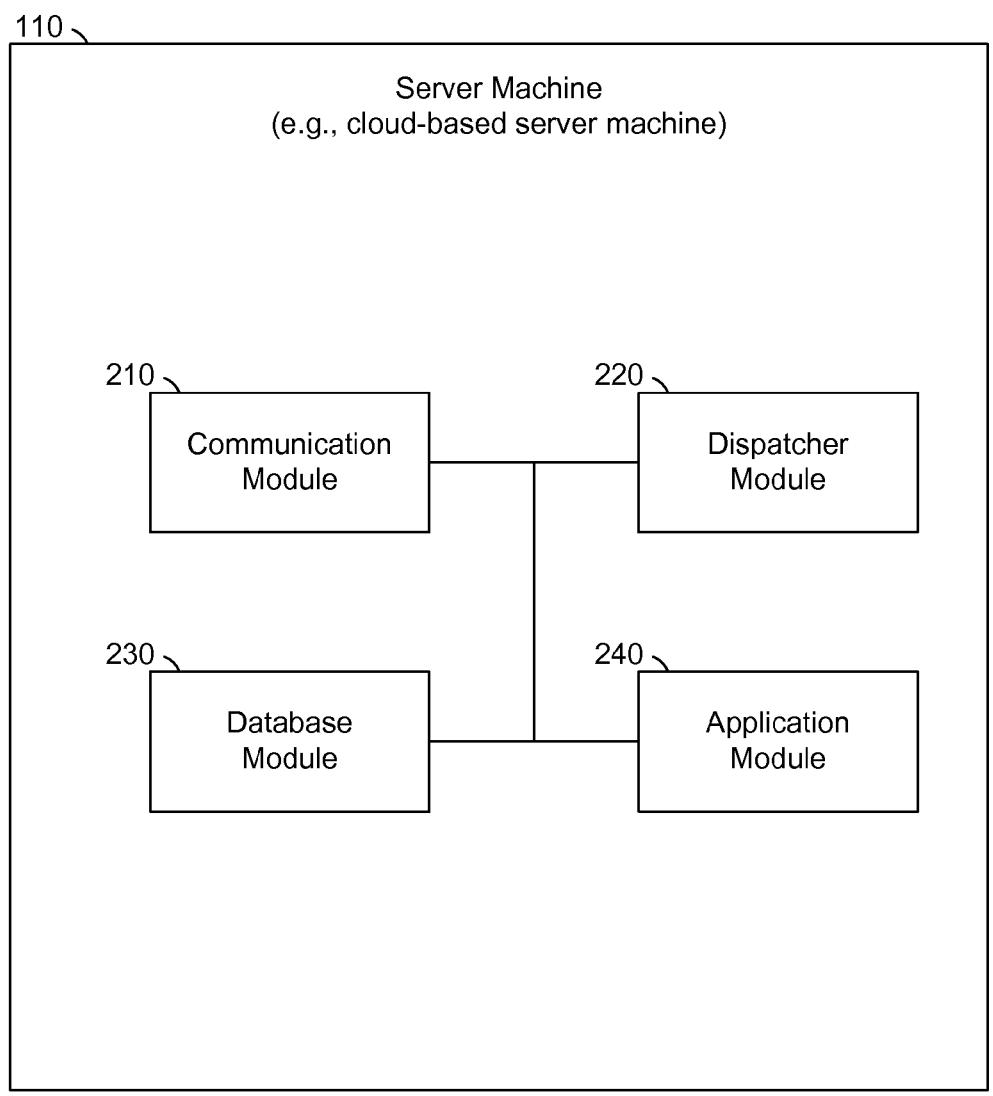

FIG. 2 is a block diagram illustrating components of the server machine 110, according to some example embodiments. The server machine 110 is shown as including a communication module 210, a dispatcher module 220, a database module 230, and an application module 240, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

As discussed in more detail below with respect to FIGS. 3-6, the communication module 210 may receive a task from a user. The dispatcher module 220 may then analyze the task to determine if all features to be used in processing the task are available in the database layer. If all such features are available, the database module 230 may perform the task in the database. If any such features are not available, the application module 240 may perform the task in the application.

Figure 3:
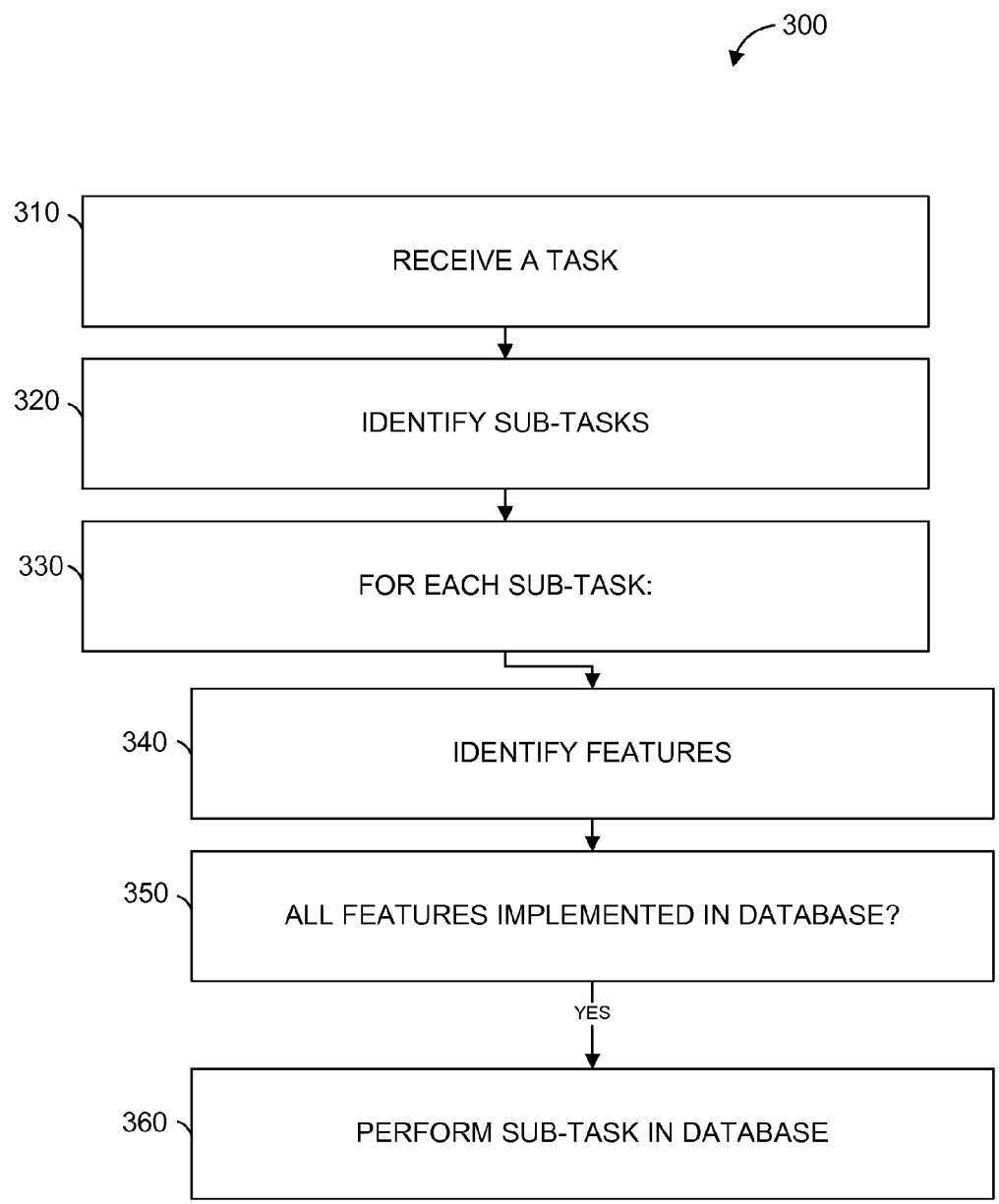
FIGS. 3-7 are flowcharts illustrating operations of devices performing various methods of dispatching database tasks, according to some example embodiments.

FIG. 3 is a flowchart illustrating operations of the device 110 in performing a method 300 of dispatching database tasks, according to some example embodiments. Operations in the method 300 may be performed by the device 110, using modules described above with respect to FIG. 2. As shown in FIG. 3, the method 300 includes operations 310, 320, 330, 340, 350, and 360.

In operation 310, the communication module 210 receives an instruction to perform a task. In some example embodiments, the task is a materials requirements processing ("MRP") task (e.g., a simulative task, an operative task, or both). The result of an MRP task may be a recommendation to produce materials, to procure materials, to distribute materials, or any suitable combination thereof. In some example embodiments, the MRP task is associated with a BOM. The BOM may include multiple component materials used in the product described by the BOM.

In operation 320, the dispatcher module 220 identifies one or more sub-tasks within the task. In some example embodiments, the sub-task is an MRP task associated with a component material in a BOM. For example, if the task is to determine how many computers can be produced in the next month, the BOM may indicate the components of the computer, and the sub-tasks may include determining how many of each component is available.

In operation 330, the dispatcher module 220 begins a loop to process each of the identified sub-tasks. Accordingly, operations 340, 350, and 360 may be performed for each identified sub-task.

In operation 340, the dispatcher module 220 identifies the features associated with the sub-task. For example, the material associated with the sub-task may be processed in fixed lot sizes or in variable lot sizes. As another example, a material may indicate that a substitute material can be used in its place. In other example embodiments, a material may indicate that a plurality of materials, together, can act as a substitute material. Any or all of these may be features.

In operation 350, the dispatcher module 220 determines if the identified features are implemented in the database layer. This may be accomplished by querying the database, checking against a known set of features, or both.

In some example embodiments, each feature corresponds to a stored procedure, or a set of stored procedures, in the database. Each stored procedure may support multiple features. In some example embodiments, all features of a task (e.g., a sub-task, a material, or both) must be implemented in the database in order for the database to be able to perform the task. In some example embodiments, when all features of the task are implemented in the database, the performance of the database in performing the task is improved. In some example embodiments, the implementation of features in the database does not necessarily correspond to functionality or performance, but reflects a user or administrator setting.

In operation 360, the dispatcher module 220 dispatches the sub-task to the database if all identified features were found to be implemented in the database layer. After receiving the sub-task, database module 230 may perform the sub-task in the database. In some example embodiments, the dispatcher module 220 dispatches the sub-task to the application layer if any of the identified features were not found to be implemented in the database. After receiving the sub-task, application module 240 may perform the sub-task in the application layer.

Figure 4:
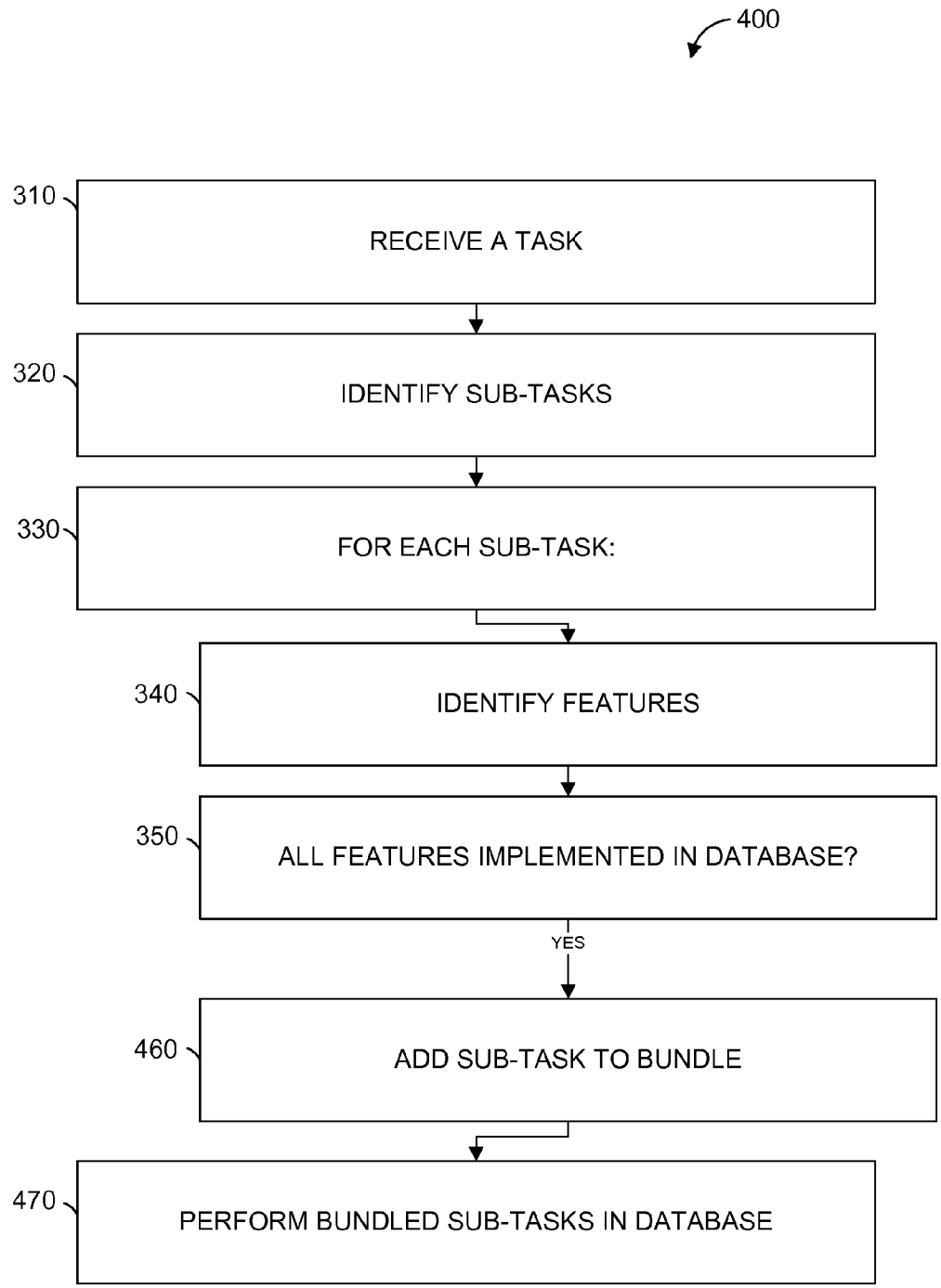

FIG. 4 is a flowchart illustrating operations of the device 110 in performing a method 400 of dispatching database tasks, according to some example embodiments. Operations in the method 400 may be performed by the device 110, using modules described above with respect to FIG. 2. As shown in FIG. 4, the method 400 includes operations 310, 320, 330, 340, 350, 460, and 470.

Operations 310, 320, 330, 340, and 350 are described above with respect to FIG. 3.

In operation 460, the dispatcher module 220 adds the sub-task to a bundle of sub-tasks if all identified features were found to be implemented in the database layer. In some example embodiments, the dispatcher module 220 adds the sub-task to a separate bundle of sub-tasks if one or more of the identified features was found to not be implemented in the database layer.

In operation 470, the dispatcher module 220 dispatches the bundle of sub-tasks for which all identified features were found to be implemented in the database layer to the database module 230. After receiving the bundle, database module 230 may perform the bundled sub-tasks in the database layer. In some example embodiments, the dispatcher module 220 dispatches the bundle of sub-tasks for which at least one identified feature was found not to be implemented in the database layer to the application module 240. After receiving the bundle, application module 240 may perform the bundled sub-tasks in the application layer.

Figure 5:
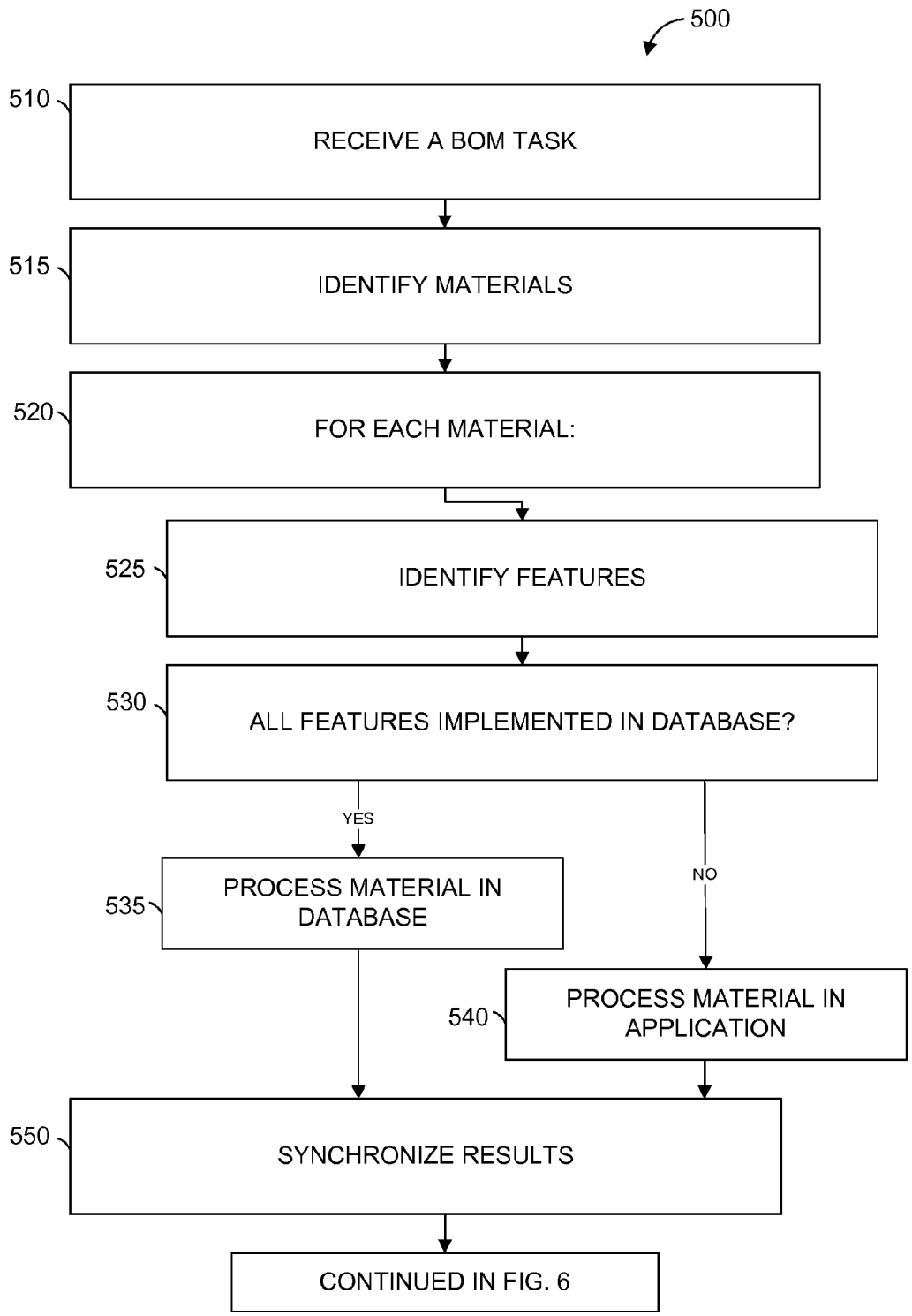
Figure 6:
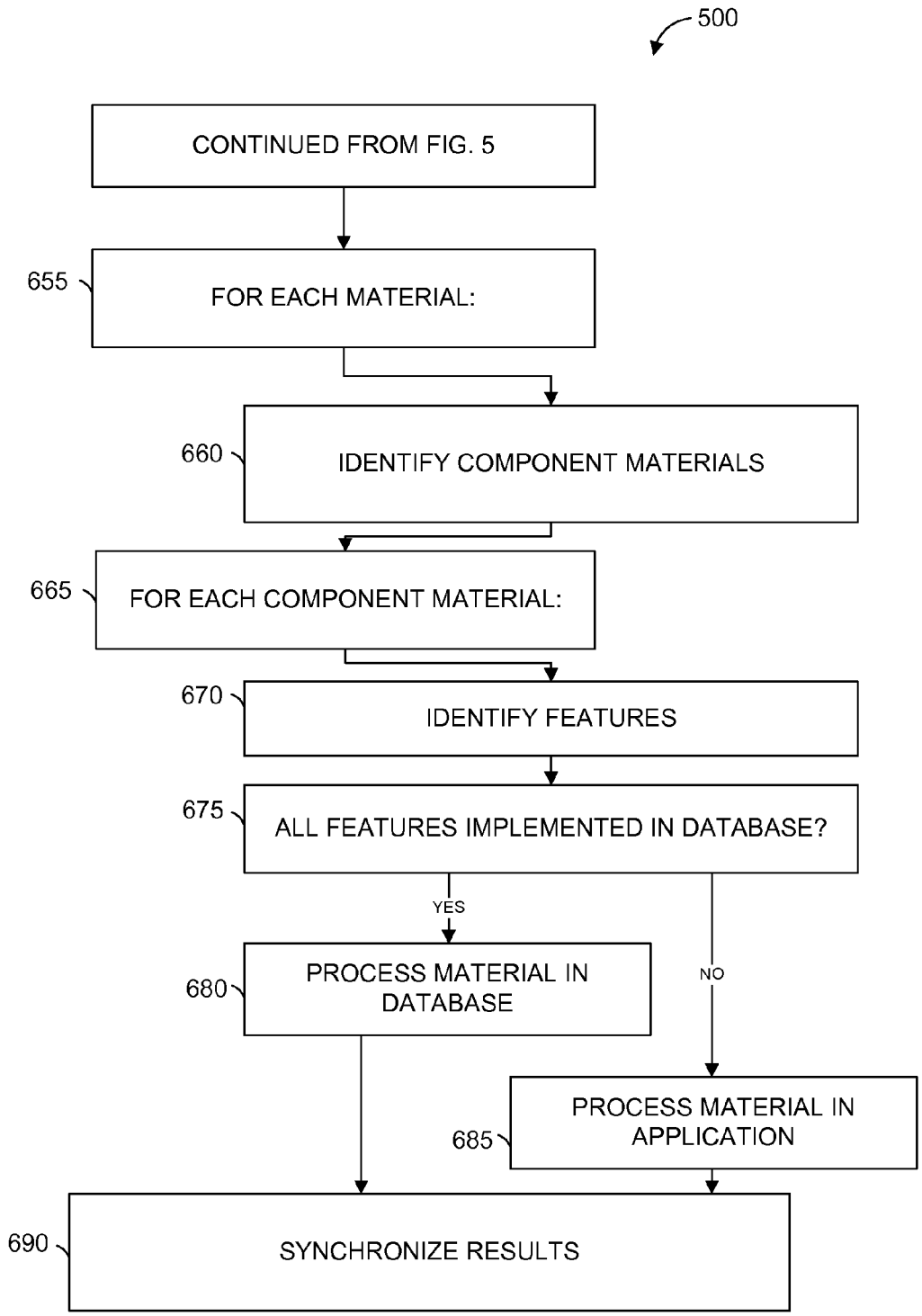

FIGS. 5-6 are flowcharts illustrating operations of the device 110 in performing a method 500 of dispatching database tasks, according to some example embodiments. Operations in the method 500 may be performed by the device 110, using modules described above with respect to FIG. 2. As shown in FIGS. 5-6, the method 500 includes operations 510, 515, 520, 525, 530, 535, 540, 550, 655, 660, 665, 670, 675, 680, 685, and 690.

In operation 510, the communication module 210 receives an instruction to perform a task related to a BOM. The result of the task may be a recommendation to produce materials, to procure materials, to distribute materials, or any suitable combination thereof. The BOM may include multiple component materials used in the product described by the BOM.

In operation 515, the dispatcher module 220 identifies one or more materials associated with the BOM.

In operation 520, the dispatcher module 220 begins a loop to process each of the identified materials. Accordingly, operations 525, 530, and one of operations 535 and 540 may be performed for each identified material.

In operation 525, the dispatcher module 220 identifies the features associated with the material. For example, the material may be processed in fixed lot sizes or in variable lot sizes. As another example, a material may indicate that a substitute material can be used in its place. In other example embodiments, a material may indicate that a plurality of materials, together, can act as a substitute material. Any or all of these may be features.

In operation 530, the dispatcher module 220 determines if the identified features are implemented in the database layer. This may be accomplished by querying the database, checking against a known set of features, or both.

In operation 535, the dispatcher module 220 dispatches the material to the database layer if all identified features were found to be implemented in the database layer. After receiving the sub-task, database module 230 may process the material in the database layer.

In operation 540, the dispatcher module 220 dispatches the material to the application layer if one or more of the identified features was found to not be implemented in the database layer. After receiving the sub-task, application module 240 may process the material in the application layer.

In operation 550, the dispatcher module 220 synchronizes the results from processing the identified materials. In some example embodiments, the dispatcher module 220 waits until the processing of all identified materials is complete.

In operation 655, the dispatcher module 220 begins a loop to process each of the identified materials. Accordingly, operation 660 may be performed for each identified material.

In operation 660, the dispatcher module 220 identifies the component materials of the material. For example, if the BOM refers to a computer, one of the identified materials may be the chassis. The chassis may be built from components such as a keyboard, a universal serial bus ("USB") port, and a high-definition multimedia interface ("HDMI") port. In this example, these components are the component materials of the chassis material.

In operation 665, the dispatcher module 220 begins a loop to process each of the identified component materials. Accordingly, operations 670, 675, and one of operations 680 and 685 may be performed for each identified component material.

In operation 670, the dispatcher module 220 identifies the features associated with the component material. For example, the material may be processed in fixed lot sizes or in variable lot sizes. As another example, a material may indicate that a substitute material can be used in its place. In other example embodiments, a material may indicate that a plurality of materials, together, can act as a substitute material. Any or all of these may be features.

In operation 675, the dispatcher module 220 determines if the identified features are implemented in the database. This may be accomplished by querying the database, checking against a known set of features, or both.

In operation 680, the dispatcher module 220 dispatches the material to the database layer if all identified features were found to be implemented in the database. After receiving the sub-task, database module 230 may process the material in the database.

In operation 685, the dispatcher module 220 dispatches the material to the application layer if one or more of the identified features was found to not be implemented in the database. After receiving the sub-task, application module 240 may process the material in the application layer.

In operation 690, the dispatcher module 220 synchronizes the results from processing the identified materials. In some example embodiments, the dispatcher module 220 waits until the processing of all identified materials is complete.

In some example embodiments, the component materials identified in operation 660 may themselves have component materials. In these example embodiments, steps 655-690 may be repeated to process the additional level of component materials. This process may be repeated at lower and lower levels until all component materials have been processed.

Figure 7:
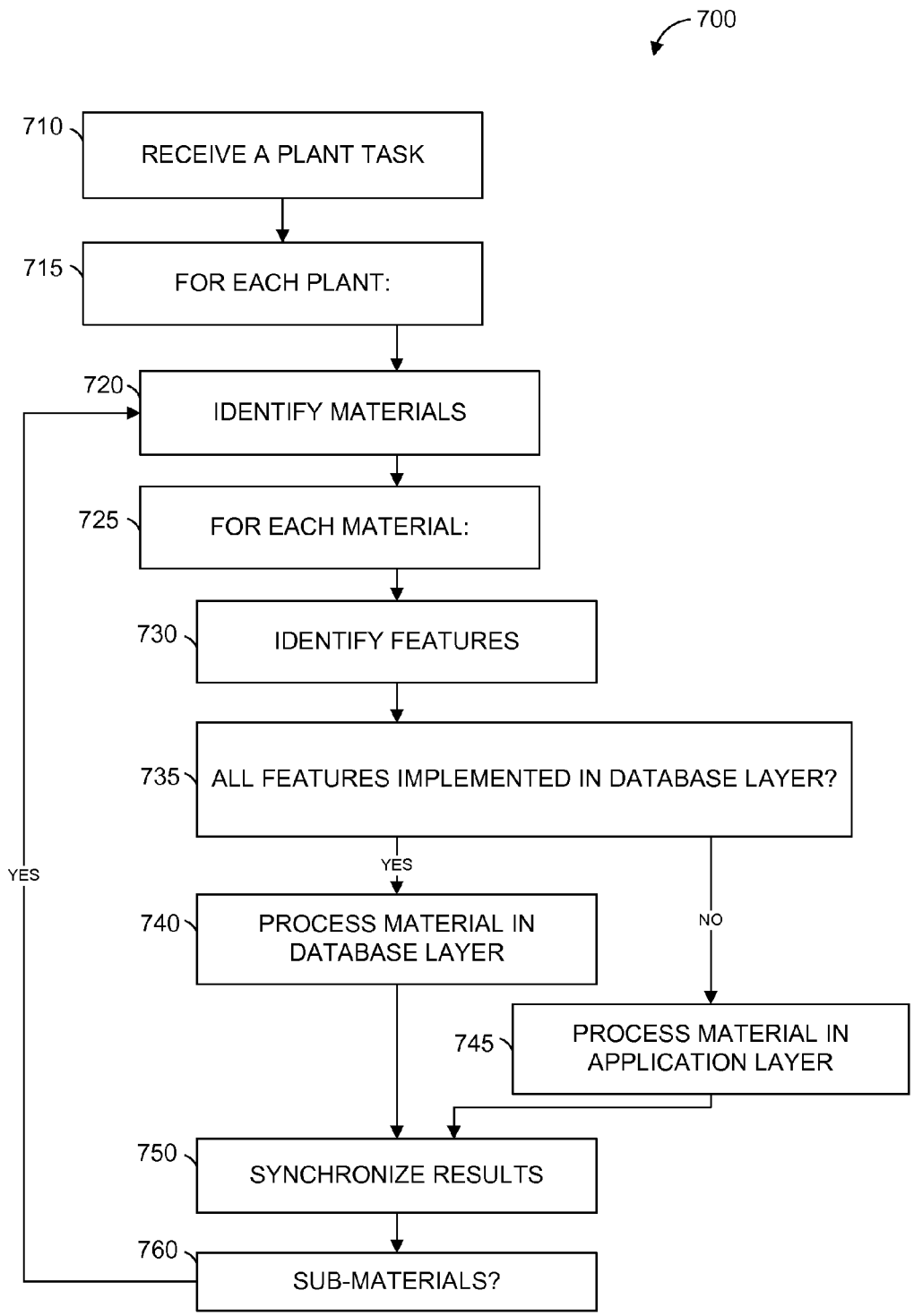

FIG. 7 is a flowchart illustrating operations of the device 110 in performing a method 700 of dispatching database tasks, according to some example embodiments. Operations in the method 700 may be performed by the device 110, using modules described above with respect to FIG. 2. As shown in FIG. 7, the method 700 includes operations 710, 715, 720, 725, 730, 735, 740, 745, 750, and 760.

In operation 710, the communication module 210 receives an instruction to perform a task plan all materials within one or several plants. The result of the task may be a recommendation to produce materials, to procure materials, to distribute materials, or any suitable combination thereof. Each material may have an associated BOM. The BOM may include multiple component materials used in the product described by the BOM.

In operation 715, the dispatcher module 220 begins a loop to process each of the identified plants. Accordingly, one or more of operations 720, 725, 730, 735, 740, 745, 750, and 760 may be performed for each plant.

In operation 720, the dispatcher module 220 identifies one or more materials associated with the plant.

In operation 725, the dispatcher module 220 begins a loop to process each of the identified materials. Accordingly, operations 725, 730, and one of operations 735 and 740 may be performed for each identified material.

In operation 730, the dispatcher module 220 identifies the features associated with the material. For example, the material may be processed in fixed lot sizes or in variable lot sizes. As another example, a material may indicate that a substitute material can be used in its place. In other example embodiments, a material may indicate that a plurality of materials, together, can act as a substitute material. Any or all of these may be features.

In operation 735, the dispatcher module 220 determines if the identified features are implemented in the database layer. This may be accomplished by querying the database, checking against a known set of features, or both.

In operation 740, the dispatcher module 220 dispatches the material to the database layer if all identified features were found to be implemented in the database layer. After receiving the sub-task, database module 230 may process the material in the database layer.

In operation 745, the dispatcher module 220 dispatches the material to the application layer if one or more of the identified features was found to not be implemented in the database layer. After receiving the sub-task, application module 240 may process the material in the application layer.

In operation 750, the dispatcher module 220 synchronizes the results from processing the identified materials. In some example embodiments, the dispatcher module 220 waits until the processing of all identified materials is complete.

In operation 760, the dispatcher module 220 begins to loop and to plan the next level of BOM in order to plan the complete structure and all related materials for the plant. For example, if the BOM refers to a computer, one of the identified materials may be the chassis. The chassis may be built from components such as a keyboard, a universal serial bus ("USB") port, and a high-definition multimedia interface ("HDMI") port. In this example, these components are the component materials of the chassis material. Thus, in this example, the dispatcher module 220 would loop back to operation 720, which would identify the component materials of the keyboard, USB port, and HDMI port and continue processing those materials. In some example embodiments, these lower-level materials would themselves have component materials, in which case the dispatcher module 220 may start another loop when operation 760 is reached at the lower level. This process of repeatedly looping with lower and lower level components may continue until all fundamental materials (e.g., materials that do not have component materials) are processed.

According to various example embodiments, one or more of the methodologies described herein may facilitate dispatching of tasks to a database upon the condition that the database is capable of performing the tasks while allowing the task to be performed in the application layer upon the condition that the database is incapable of performing the task. Moreover, one or more of the methodologies described herein may facilitate the use of a higher-speed database solution when one is available. According to various example embodiments, dispatching the task based on the implementation of features in the database may allow a user to submit tasks without being concerned about whether the task will ultimately be performed in the database layer or in the application layer, saving the user time. According to various example embodiments, one or more of the methodologies described herein may allow application developers to implement general-purpose solutions in the application layer and only provide database layer support for the most frequently-used features, maximizing the impact of development efforts.

When these effects are considered in aggregate, one or more of the methodologies described herein may obviate a need for certain efforts or resources that otherwise would be involved in dispatching tasks. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 8:
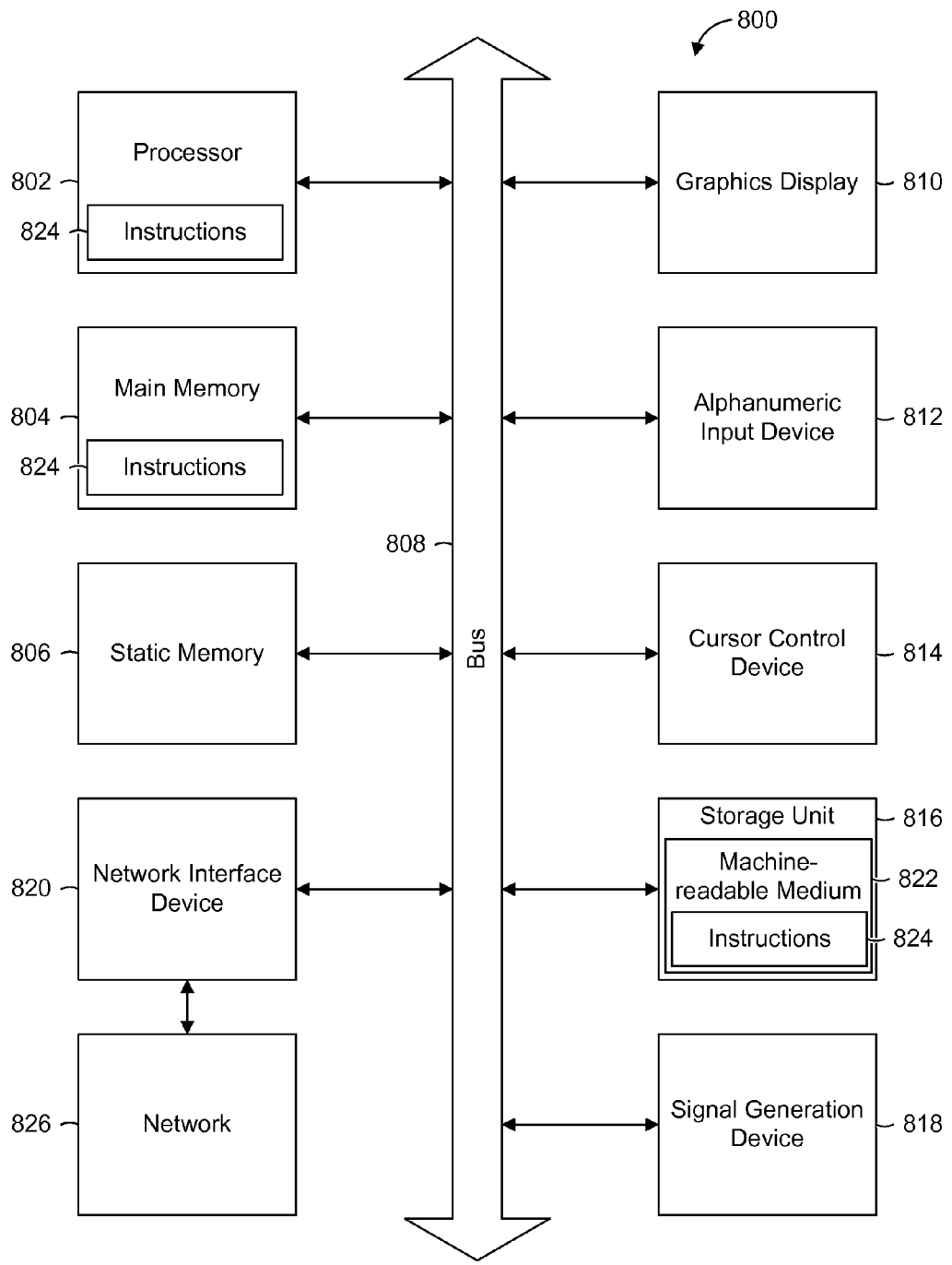
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 8 shows a diagrammatic representation of the machine 800 in the example form of a computer system and within which instructions 824 (e.g., software, a program, an application, an applet, an app, or other executable code) for causing the machine 800 to perform any one or more of the methodologies discussed herein may be executed, in whole or in part. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 (e.g., network 190) via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A method comprising:
receiving, at a processor of a machine, an instruction to perform a task;
identifying a plurality of sub-tasks within the task;
for each of the plurality of sub-tasks:
   accessing a data structure associated with the sub-task, the data structure indicating a plurality of features related to the sub-task;
   determining whether each feature of the plurality of features is implemented in a database; and
   when each feature of the plurality of features is implemented in the database, performing the sub-task in the database.

2. The method of description 1, wherein:
the database is an in-memory database.

3. The method of descriptions 1 or 2, further comprising:
for each of the plurality of sub-tasks:
   when one or more features of the plurality of features is not implemented in the database, performing the sub-task in an application layer.

4. The method of any of descriptions 1-3, wherein:
the performing the sub-task in the database comprises:
   adding the sub-task to a bundle of sub-tasks; and
   performing the bundle of sub-tasks in the database.

5. The method of any of descriptions 1-4, wherein:
the task includes procuring materials and
each of the plurality of sub-tasks is associated with one of a plurality of materials.

6. The method of description 5, further comprising:
identifying a component material of the plurality of materials;
accessing a data structure associated with the component material, the data structure indicating a plurality of features related to the component material;
determining whether each feature of the plurality of features related to the component material is implemented in the database; and
when each feature of the plurality of features related to the component material is implemented in the database, processing the component material in the database.

7. The method of description 6, further comprising:
prior to processing the component material in the database:
   processing a sub-task in an application layer, the sub-task being one of the plurality of sub-tasks and not contained in the bundle of sub-tasks; and
synchronizing a result of processing the bundle in the database with a result of processing the sub-task in the application layer.

8. A non-transitory machine-readable storage medium comprising instructions that, when executed by one or more processors of a machine, cause the machine to perform operations comprising:
receiving, at a processor of a machine, a request to perform a task;
identifying a plurality of sub-tasks within the task;
for each of the plurality of sub-tasks:
   accessing a data structure associated with the sub-task, the data structure indicating a plurality of features related to the sub-task;
   determining whether each feature of the plurality of features is implemented in a database; and
   when one or more features of the plurality of features is not implemented in the database, performing the sub-task in an application layer.

9. The non-transitory machine-readable storage medium of description 8, wherein:
the database is an in-memory database.

10. The non-transitory machine-readable storage medium of description 8 or 9, wherein performing the sub-task in the application layer comprises:
adding the sub-task to a bundle of sub-tasks; and
performing the bundle of sub-tasks in the application layer.

11. The non-transitory machine-readable storage medium of any of descriptions 8-10, wherein:
the task includes procuring materials; and
each of the plurality of sub-tasks is associated with one of a plurality of materials.

12. The non-transitory machine-readable storage medium of description 11, wherein the operations further comprise:
identifying a component material of the plurality of materials;
accessing a data structure associated with the component material, the data structure indicating a plurality of features related to the component material;
determining whether each feature of the plurality of features related to the component material is implemented in the database; and
when each feature of the plurality of features related to the component material is implemented in the database, processing the component material in the database.

13. The non-transitory machine-readable storage medium of description 12, wherein the operations further comprise:
prior to processing the component material in the database:
   processing a sub-task in an application layer, the sub-task being one of the plurality of sub-tasks and not contained in the bundle of sub-tasks; and
synchronizing a result of processing the bundle in the database with a result of processing the sub-task in the application layer.

14. A system comprising:
a communications module, configured to:
   receive, at a processor of a machine, a request to perform a task;
a dispatcher module, configured to:
   identify a plurality of sub-tasks within the task;
   for each of the plurality of sub-tasks:
      access a data structure associated with the sub-task, the data structure indicating a plurality of features related to the sub-task; and
      determine whether each feature of the plurality of features is implemented in a database; and a database module, configured to:
  for each of the plurality of sub-tasks for which each feature of the plurality of features is implemented in the database:
    perform the sub-task in the database.

15. The system of description 14, wherein:
the database is an in-memory database.

16. The system of description 14 or 15, further comprising:
an application module, configured to:
  for each of the plurality of sub-tasks for which one or more features of the plurality of features is not implemented in the database:
    perform the sub-task in the application layer.

17. The system of any of descriptions 14-16, wherein:
the dispatcher module is further configured to:
  add the sub-task to a bundle of sub-tasks; and wherein
the performing of each sub-task in the database by the database module comprises performing the bundle of sub-tasks in the database.

18. The system of any of descriptions 14-17, wherein:
the task includes procuring materials; and
each of the plurality of sub-tasks is associated with one of a plurality of materials.

19. The system of description 18, wherein:
the dispatcher module is further configured to:
  identify a component material of the plurality of materials;
  access a data structure associated with the component material, the data structure indicating a plurality of features related to the component material;
  determine whether each feature of the plurality of features related to the component material is implemented in the database; and
the database module is further configured to:
  when each feature of the plurality of features related to the component material is implemented in the database, process the component material in the database.

20. The system of description 19, wherein the application module is further configured to:
  prior to the processing of the component material in the database, process a sub-task in an application layer, the sub-task being one of the plurality of sub-tasks and not contained in the bundle of sub-tasks; and
  synchronize a result of processing the bundle in the database with a result of processing the sub-task in the application layer.

What is claimed is:

1. A method comprising:
receiving, at a processor of a machine, an instruction to perform a task;
identifying a sub-task within the task;
accessing a data structure associated with the sub-task, the data structure indicating a plurality of features each comprising processing functionality that will be used to complete the sub-task;
determining, for each feature of the plurality of features, whether the feature is implemented in a database; and
performing the sub-task in either the database or an application layer based on the determining, wherein:
  in accordance with determining that at least a first feature of the plurality of features is implemented in the database and at least a second feature of the plurality of features is not implemented in the database, performing the sub-task in the application layer, and
  in accordance with determining that all of the plurality of features are implemented in the database, performing the sub-task in the database.

2. The method of claim 1, wherein:
the database is an in-memory database.

3. The method of claim 1, wherein:
the task includes procuring materials and
the sub-task is associated with one of a plurality of materials.

4. The method of claim 1, wherein the performing of the sub-task in the application layer comprises:
adding the sub-task to a bundle of sub-tasks for which at least one feature was determined to not be implemented in the database; and
passing the bundle to the application layer.

5. The method of claim 1, wherein the task includes determining, for a given bill of materials, a quantity of materials available on-hand.

6. The method of claim 1, wherein the performing of the sub-task in the database comprises:
adding the sub-task to a bundle of sub-tasks for which all features were determined to be implemented in the database; and
passing the bundle to the database.

7. A non-transitory machine-readable storage medium comprising instructions that, when executed by one or more processors of a machine, cause the machine to perform operations comprising:
receiving, at a processor of a machine, a request to perform a task;
identifying a sub-task within the task;
accessing a data structure associated with the sub-task, the data structure indicating a plurality of features each comprising processing functionality that will be used to complete the sub-task;
determining, for each feature of the plurality of features, whether the feature is implemented in a database; and
performing the sub-task in either the database or an application layer based on the determining, wherein:
  in accordance with determining that at least a first feature of the plurality of features is implemented in the database and at least a second feature of the plurality of features is not implemented in the database, performing the sub-task in the application layer, and
  in accordance with determining that all of the plurality of features are implemented in the database, performing the sub-task in the database.

8. The non-transitory machine-readable storage medium of claim 7, wherein:
the database is an in-memory database.

9. The non-transitory machine-readable storage medium of claim 7, wherein:
the task includes procuring materials; and
the sub-task is associated with one of a plurality of materials.

10. The non-transitory machine-readable storage medium of claim 7, wherein the performing of the sub-task in the application layer comprises:
adding the sub-task to a bundle of sub-tasks for which at least one feature was determined to not be implemented in the database; and
passing the bundle to the application layer.

11. The non-transitory machine-readable storage medium of claim 7, wherein the task includes determining, for a given bill of materials, a quantity of materials available from suppliers.

12. The non-transitory machine-readable storage medium of claim 7, wherein the performing of the sub-task in the database comprises:
  adding the sub-task to a bundle of sub-tasks for which all features were determined to be implemented in the database; and
  passing the bundle to the database.

13. A system comprising:
  a memory having instructions embodied thereon; and
  one or more processors configured by the instructions to perform operations comprising:
    receiving a request to perform a task;
    identifying a sub-task within the task;
    accessing a data structure associated with the sub-task, the data structure indicating a plurality of features each comprising processing functionality that will be used to complete the sub-task;
    determining, for each feature of the plurality of features, whether the feature is implemented in a database; and
    performing the sub-task in either the database or an application layer based on the determining, wherein:
      in accordance with determining that at least a first feature of the plurality of features is implemented in the database and at least a second feature of the plurality of features is not implemented in the database, performing the sub-task in the application layer, and
      in accordance with determining that all of the plurality of features are implemented in the database, performing the sub-task in the database.

14. The system of claim 13, wherein:
  the database is an in-memory database.

15. The system of claim 13, wherein:
  the task includes procuring materials; and
  the sub-task is associated with one of a plurality of materials.

16. The system of claim 13, wherein the performing of the sub-task in the application layer comprises:
  adding the sub-task to a bundle of sub-tasks for which at least one feature was determined to not be implemented in the database; and
  passing the bundle to the application layer.

17. The system of claim 13, wherein the task includes determining, for a given bill of materials, a transport time for a material in the bill of materials.

18. The system of claim 13, wherein the performing of the sub-task in the database comprises:
  adding the sub-task to a bundle of sub-tasks for which all features were determined to be implemented in the database; and
  passing the bundle to the database.

* * * * *